United States Patent
Pasenau

(10) Patent No.: US 9,610,951 B2
(45) Date of Patent: Apr. 4, 2017

(54) METHOD FOR OPERATING A DRIVE TRAIN OF A MOTOR VEHICLE

(71) Applicant: Bayerische Motoren Werke Aktiengesellschaft, Munich (DE)

(72) Inventor: Thiemo Pasenau, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/863,720

(22) Filed: Sep. 24, 2015

(65) Prior Publication Data

US 2016/0009287 A1 Jan. 14, 2016

Related U.S. Application Data

(63) Continuation of application No. PCT/EP2014/057825, filed on Apr. 16, 2014.

(30) Foreign Application Priority Data

Apr. 18, 2013 (DE) .................. 10 2013 207 015

(51) Int. Cl.
- *B60W 10/02* (2006.01)
- *B60W 10/11* (2012.01)
- *B60W 30/18* (2012.01)
- *B60W 30/182* (2012.01)

(Continued)

(52) U.S. Cl.
CPC ...... *B60W 30/18072* (2013.01); *B60W 10/02* (2013.01); *B60W 10/11* (2013.01);
(Continued)

(58) Field of Classification Search
None
See application file for complete search history.

(56) References Cited

U.S. PATENT DOCUMENTS

2008/0255738 A1* 10/2008 Murayama ............ B60W 30/19
701/54
2010/0100290 A1 4/2010 Sauter et al.
(Continued)

FOREIGN PATENT DOCUMENTS

| CN | 102211578 A | 10/2011 |
| CN | 102470871 A | 5/2012 |

(Continued)

OTHER PUBLICATIONS

International Search Report (PCT/ISA/210) issued in PCT Application No. PCT/EP2014/057825 dated Jun. 30, 2014 with English translation (Four (4) pages).

(Continued)

*Primary Examiner* — Edwin A Young
(74) *Attorney, Agent, or Firm* — Crowell & Moring LLP

(57) ABSTRACT

A method of operating a drive train of a motor vehicle is provided, wherein the drive train has a drive motor and an automatic or automated transmission connected between the drive motor and the drive wheels. The transmission automatically changes gear in an automatic mode. The transmission changes to a higher or lower gear in a manual mode on the basis of an up-shift or a down-shift requested by the driver via control element. At least in automatic mode, a coasting mode of the drive train, in which the operative connection between drive motor and drive wheels is separated, is engaged under defined operating conditions and the coasting mode is disengaged upon the driver requesting a downshift and the manual mode of the transmission is engaged. The coasting mode is maintained in automatic mode in the case of the driver requesting an up-shift during coasting mode.

9 Claims, 1 Drawing Sheet

(51) Int. Cl.
*F16H 61/18* (2006.01)
*F16H 59/18* (2006.01)

(52) U.S. Cl.
CPC .......... *B60W 30/182* (2013.01); *F16H 61/18* (2013.01); *B60W 2030/1809* (2013.01); *B60W 2540/16* (2013.01); *B60W 2710/021* (2013.01); *B60W 2710/1005* (2013.01); *F16H 2059/186* (2013.01)

(56) References Cited

U.S. PATENT DOCUMENTS

| | | | |
|---|---|---|---|
| 2012/0220422 A1* | 8/2012 | Wurthner | B60W 10/02 477/79 |
| 2012/0220424 A1* | 8/2012 | Staudinger | B60W 30/16 477/80 |
| 2012/0245810 A1 | 9/2012 | Staudinger et al. | |

FOREIGN PATENT DOCUMENTS

| | | |
|---|---|---|
| DE | 103 49 445 A1 | 5/2004 |
| DE | 10 2008 042 959 A1 | 4/2010 |
| DE | 10 2009 045 091 A1 | 3/2011 |
| DE | 10 2009 057 551 A1 | 6/2011 |
| JP | 60-211154 A | 10/1985 |

OTHER PUBLICATIONS

German-language Search Report issued in counterpart German Application No. 10 2013 207 015.2 dated Jan. 20, 2014 with partial English translation (Ten (10) pages).

Chinese-language Office Action issued in counterpart Chinese Application No. 201480017346.0 dated Jan. 3, 2017 with English translation (Nine (9) pages).

\* cited by examiner

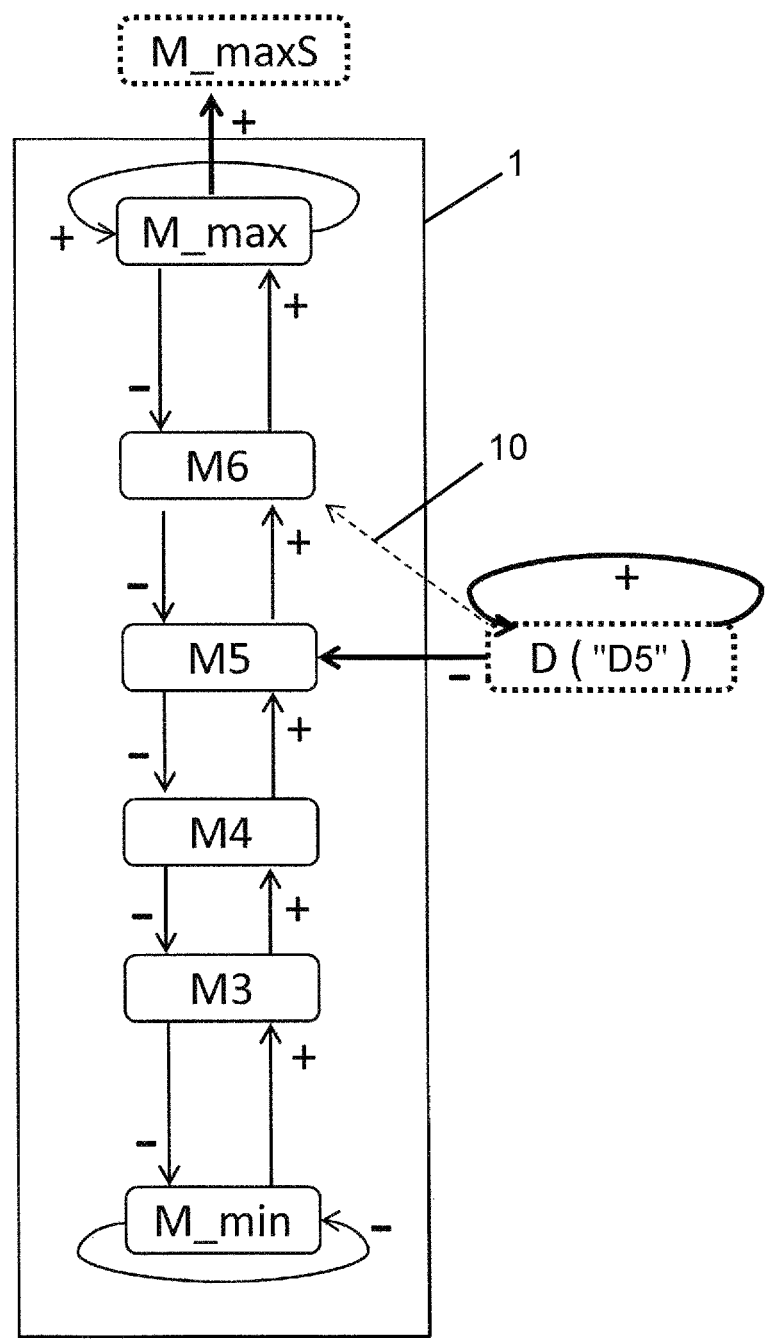

METHOD FOR OPERATING A DRIVE TRAIN OF A MOTOR VEHICLE

CROSS REFERENCE TO RELATED APPLICATIONS

This application is a continuation of PCT International Application No. PCT/EP2014/057825, filed Apr. 16, 2014, which claims priority under 35 U.S.C. §119 from German Patent Application No. 10 2013 207 015.2, filed Apr. 18, 2013, the entire disclosures of which are herein expressly incorporated by reference.

BACKGROUND AND SUMMARY OF THE INVENTION

The invention relates to a method for operating a drive train of a motor vehicle, wherein the drive train comprises a drive motor and an automatic or automated transmission connected between the drive motor and the drive wheels.

At present, vehicles which are equipped with an automatic transmission or an automated transmission can usually be operated in at least two different transmission operating modes. If the driver changes to the D transmission gear position, the transmission control occurs in a fully automatic first operating mode (=automatic mode), i.e. the transmission control unit selects the optimal transmission gear for the current operating state on the basis of evaluated vehicle parameters and changes thereto. In addition to this automatic mode, the driver can change by means of corresponding use of the gear lever to a manual mode, in which a down-shift or up-shift typically only occurs when the driver requests an up-shift or down-shift by way of an operating element (for example, by pressing a selector lever forward or backward) provided therefor. Alternatively, the automatic mode can also be left and changed to manual mode with the correspondingly requested gear through actuation of an operating element typically disposed near the steering wheel, through which the driver can request an up-shift or down-shift. Such a so-called automatic transmission with Steptronic is known, for example, from the current BMW 5-Series.

It is further known that motor vehicles consume very little fuel when they "coast," that is, when they use their kinetic energy to roll as far as possible without being slowed down by the drag torque of the engine. Already known from DE 10 2009 057 551 A1 is a method for operating a drive train in a motor vehicle, wherein the internal combustion engine is decoupled from the drive wheels of a moving motor vehicle in the presence of predetermined operating conditions, thus is transferred into coasting operation or coasting mode.

Finally, vehicles with automatic transmissions are already on the market, in which wherein the automatic transmission can be operated in an automatic mode or a normal mode, and wherein in automatic mode the transmission can be shifted to a coasting mode of the drive train in the presence of predefined operating conditions, in which the operative connection between the internal combustion engine and the drive wheels is separated. If during coasting mode a manual up-shift or down-shift by the driver occurs by use of the operating elements provided therefor, the coasting mode is left and changed to the normal mode of the drive train, i.e. the operative connection between the internal combustion engine and the drive wheels is restored.

The object of the invention is to provide an improved method in terms of comfort for operating a drive train of a vehicle with automatic transmission or automated transmission, which can be operated in coasting mode under certain conditions.

This and other objects are achieved by a method for operating a drive train of a motor vehicle, wherein the drive train comprises a drive motor and an automatic or automated transmission connected between the drive motor and the drive wheels. The transmission automatically changes gear in an automatic mode. The transmission in manual mode is changed to a higher or lower gear dependent on an up-shift or down-shift requested by the driver by way of an operating element. At least in automatic mode, a shift occurs in the presence of defined operating conditions to a coasting mode of the drive train, in which the operative connection between the drive motor and the drive wheels is disengaged. The coasting mode is left when a driver requests a down-shift and shifts to the manual mode of the transmission. In an up-shift requested by the driver during coasting mode, the coasting mode is maintained in automatic mode.

The method according to the invention, as well as the advantageous embodiments thereof, can be carried out by way of an executed algorithm or a corresponding disposition of components in a control device provided therefor, for example in a transmission control device.

In the invention, it is assumed that the vehicle includes an automatic or automated transmission connected between the drive motor and the drive wheels, and that the transmission can be operated both in automatic mode, in which the gear is changed automatically, i.e. independently of the driver, and in manual mode, in which the gear is changed to a higher or lower gear dependent on an up-shift or down-shift requested by the driver by way of an operating element. Further, the method for operating the drive train of the vehicle is fundamentally configured such that at least in automatic operation, the transmission can be changed to a coasting mode, in which the operating connection between the drive wheels and the drive motor is separated in the presence of defined operating conditions (for instance, neither the gas pedal nor the brake pedal is actuated). This can take place in that, in coasting mode, an automatic or automated clutch connecting the drive wheels with the drive motor is opened and/or the transmission is shifted into a neutral position. An automated clutch is to be here understood as all couplings (or transmission shifting mechanisms) of the (automatic) transmission which are required to engage the individual gears and connect the drive motor with the transmission output such that a frictional connection exists between the drive unit and the drive wheels. In addition, the drive motor can be turned off during coasting mode.

In principle, the coasting mode can also be permitted only when the driver desires a predetermined, for example particularly energy efficient, driving mode. This desire for an energy-efficient driving mode can be detected by analysis of driver behavior or the vehicle behavior or by evaluating and recognizing a driver-selectable operating mode (for example, an ECO mode).

The coasting mode is then usually left when the driver actuates the gas pedal (or the brake pedal) to at least a given degree. Likewise, the coasting mode is left when the driver actuates an operating element provided for shifting the transmission stage back to manual mode.

However, if in coasting mode the driver actuates in a corresponding manner an operating element provided for up-shifting the transmission stage in manual mode, it can be inferred that at this time the driver at least desires no deceleration of the motor vehicle. Since, however, a termination of the coasting mode is usually accompanied—if only slightly—by a deceleration of the vehicle due to the drag torque, the method according to the invention provides that during an up-shift requested by the driver in coasting mode, the coasting mode of the drive train is maintained (when no other termination condition for coasting mode is met), i.e. the up-shift request does not affect the control of the transmission or the drive train.

Advantageously, the coasting mode is then maintained in automatic mode during an up-shift request from the driver during coasting mode if the up-shift occurs by way of an operating element disposed in the region of the steering wheel, in particular a rocker switch located there. If, by means of actuation of the transmission selector lever, the driver changes through corresponding actuation to manual mode while also requesting an up-shift, the coasting mode can hereby be directly left and changed to manual mode (incl. an up-shift), corresponding to the request. The driver thus has the possibility, by means of a corresponding actuation of an operating element, to actively leave the coasting mode and to execute an up-shift, if he so wishes.

In order to inform the driver that although his up-shift request is detected, this will not be carried out due to the presence of coasting mode, a shift request display is activated at least for a predetermined time interval in the case of a requested up-shift during coasting mode and when coasting mode remains. After completion of this shift request display, the driver can again be displayed the original display which was displayed at the point in time before the up-shift request was active (for instance, that he is currently in coasting mode). This shift request display can be identical to a display which appears when the vehicle is in manual mode and he requests an up-shift and this will be implemented.

As already described earlier, it can be assumed during a down-shift request of the driver during coasting mode that he anticipates a deceleration of the vehicle, or even expects this. In this case, coasting mode is left and possibly simultaneously changed to the manual mode of the vehicle. Advantageously, in a requested down-shift during coasting mode, the coasting mode is left by closing the operative connection between the drive motor and drive wheels, and the gear virtually engaged during coasting mode is maintained in the change to manual operation. This means that even in this case no gear shift occurs, as a deceleration of the motor vehicle, which the driver would also expect during a down-shift, is already caused through the ending of the coasting mode and the reestablishment of the operative connection associated therewith.

Advantageously, the method according to the invention for operating a drive train of the motor vehicle motor is additionally designed such that, under the assumption that the motor vehicle or transmission is in manual mode and that the highest gear is thereby already engaged, in a requested up-shift (which cannot be implemented as the transmission is already in the highest gear), the drive train is changed to coasting mode. The driver should thereby be made to feel that due to his up-shift request in the highest gear, the drive train control or regulation is altered in such a way as would already be expected with a further up-shift in similar manner.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a simplified diagram of the circuitry of vehicles with automatic transmissions, which could at least be operated in certain operating situations in coasting mode.

DETAILED DESCRIPTION OF THE DRAWING

The single FIGURE shows a simplified diagram of the circuitry of vehicles with automatic transmissions, which could at least be operated in certain operating situations in coasting mode. Further, the automatic transmission can be operated in an automatic mode and in a manual mode, whereby in automatic mode the gear is automatically changed, and in manual mode the gear is primarily only changed when a shift request is detected from the driver. The shift request may be undertaken by use of so-called rocker switches, which are already disposed in the region of the steering wheel. The rocker switches can thereby be designed such that when a rocker switch disposed on the right side of the steering wheel is moved, an up-shift request is triggered and when a rocker switch disposed on the left side of the steering wheel is moved, a down-shift is requested.

In principle, it is already known that the driver of a motor vehicle, as is defined above, can request an up-shift or down-shift by actuation of the rocker switches disposed on the steering wheel—regardless of whether the vehicle is already in manual mode, or is only changed to manual mode due to the shift request.

The FIGURE shows in field 1 the shifting strategy in manual mode of the motor vehicle, wherein the individual fields M_min to M_max represent a currently engaged gear in manual mode, and an up-shift is represented by a plus + and a down-shift by a minus −. If, for example, in 4th gear M4, the driver moves the rocker switch disposed on the right side of the steering wheel, and thus expresses the desire for an up-shift, the next highest 5th gear M5 is shifted from 4th gear M4 (change of M4 along the path + to M5). If in 4th gear M4 the driver moves the rocker switch disposed on the left side of the steering wheel, and thus expresses the desire for a down-shift, the next lowest 3th gear M3 is shifted from 4th gear M4 (change of M4 along the path − to M3). This shifting logic applies for all gears from M_min to M_max with the following restrictions: If the rocker switch disposed on the left side of the steering wheel is actuated in the lowest gear M_min, and the driver thereby expresses that he wishes a down-shift—as this is no longer possible—the smallest gear M_min will remain. If the rocker switch disposed on the right side of the steering wheel is actuated in the highest gear M_max, and the driver thereby expresses that he wishes an up-shift, it was previously the case that no gear shift would occur (as no up-shift is possible) and this gear would remain.

Under consideration, however, of the method according to the invention, although here too occurs no shifting process in the highest gear M_max in the case of an up-shift request, as an up-shift is no longer possible, the clutch is automatically opened here, and thereby the operative connection between the drive motor and the drive wheels is interrupted, i.e. a change occurs to the coasting mode of the drive train. This coasting mode is identified in the FIG. through the dotted field M_maxS shown at the top over field 1. A change to coasting mode, however, is only undertaken when the usual conditions which permit a change into coasting mode are met. In this example, a change to coasting mode is permitted if at the time of the up-shift request in the highest gear M_max, neither the gas pedal nor the brake pedal are actuated.

In spite of the interrupted operative connection, the optimal gear will continue to be determined on the basis of existing operating conditions and, if necessary, shifted thereto, so that in the case of termination of coasting mode (for instance through actuation of the gas pedal or brake pedal to a predetermined extent), the optimal gear for this operating condition of the vehicle is already engaged.

Another important point in the circuitry according to the invention is the change out of the coasting mode in the case of a shifting request requested by the driver by use of a shift paddle. If the vehicle is currently in coasting mode with a virtually engaged 5th gear (the operative connection between the drive motor and the drive wheels is interrupted, so that the engaged gear has no effect), which is indicated in the FIGURE with the dotted field D ("D5"), and if the driver moves the rocker switch disposed on the right side of the steering wheel, thus expressing his desire for an up-shift, the coasting mode is nevertheless maintained, as long as no other coasting mode exit conditions exist. In order to inform the driver that his up-shift request has been registered, a shift request display provided for this purpose is at least briefly activated. In the present example, that display is activated which the driver would receive if the up-shift request were to be implemented and the transmission shifted in manual mode to the next highest gear. This activation of the display is identified by the dashed arrow 10 from the coasting mode D ("D5") to M6. After the end of the predetermined time interval, while the shift request display is active, the display changes again to the coasting mode identifying display.

If, in the represented coasting mode D ("D5"), the driver moves the rocker switch disposed on the left side of the steering wheel and thus expresses his desire for a down-shift, the coasting mode D ("D5") is left through closing of the clutch and thereby reestablishment of the operative connection between the drive motor and the drive wheels. A down-shift from the gear virtually engaged (but inactive) during coasting mode to the next lowest gear is not made at this time, as a deceleration, which is to be expected by the driver, is already experienced by the vehicle through leaving the coasting mode.

By way of the method according to the invention represented here and the advantageous developments thereof, the acceptance of a coasting mode in motor vehicles with automatic or automated transmissions can be increased in a simple and cost-effective manner, as the driver experiences a change of the motor vehicle motion during a shift request in coasting mode (either deceleration of the motor vehicle during a down-shift request or no deceleration of the motor vehicle during an up-shift request) that is understood by him.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a drive train comprising a drive motor and an automatic or automated transmission coupled between the drive motor and drive wheels of a motor vehicle, wherein the automatic or automated transmission is operatively configured to, in an automatic mode, automatically change between gears, and to, in a manual mode, change gears to a higher or lower gear in response to a corresponding one of an up-shift request or a down-shift request from at least one driver-actuated manual shift operating element, the method comprising the acts of:

determining whether the automatic or automated transmission is in the automatic mode or the manual mode;

when in the automatic mode, shifting the automatic or automated transmission into a coasting mode the drive train in which an operative connection between the drive motor and the drive wheels is disengaged when predefined vehicle operating conditions for entry into the coasting mode exist;

determining whether the down-shift request is present when the automatic or automated transmission is in automatic mode and in the coasting mode;

when in the automatic mode and the coasting mode and the down-shift request is present, shifting from the coasting mode to the manual mode; and determining whether the up-shift request is present when the automatic or automated transmission is in automatic mode and in the coasting mode;

when in the automatic mode and the coasting mode and the up-shift request is present, the automatic mode and the coasting mode are maintained.

2. The method according to claim 1, wherein in response to an up-shift request during the coasting mode, the coasting mode is maintained if the up-shift request occurs via a one of the at least one operating elements disposed in a region of a steering wheel of the vehicle.

3. The method according to claim 2, wherein when in response to the up-shift request during the coasting mode the coasting mode is maintained, a shift request display is activated for a predetermined time interval.

4. The method according to claim 3, wherein in response to the down-shift request when in the coasting mode, the operative connection between the drive motor and the drive wheels is closed.

5. The method according to claim 4, wherein when the operative connection between the drive motor and the drive wheels is closed in response to the down-shift request, a change to manual mode occurs, and during the change to the manual mode, a down-shift is not made from a gear previously engaged in the automatic or automated transmission while the operative connection between the drive motor and the drive wheels was open in the coasting mode.

6. The method according to claim 1, wherein when in response to an up-shift request during the coasting mode the coasting mode is maintained, a shift request display is activated for a predetermined time interval.

7. The method according to claim 1, wherein in response to the down-shift request when in the coasting mode, the operative connection between the drive motor and the drive wheels is closed.

8. The method according to claim 7, wherein when the operative connection between the drive motor and the drive wheels is closed in response to the down-shift request, a change to manual mode occurs, and during the change to the manual mode, a down-shift is not made from a gear previously engaged in the automatic or automated transmission while the operative connection between the drive motor and the drive wheels was open in the coasting mode.

9. The method according to claim 1, wherein in response to the up-shift request when in manual mode, if prior to the up-shift request a highest gear of the automatic or automated transmission was engaged and the operative connection between the drive motor and the drive wheels was closed, the manual mode is changed to the coasting mode.

* * * * *